Feb. 10, 1925.

H. D. GILBERT

MILK BOTTLE HOLDER

Filed June 29, 1923    2 Sheets-Sheet 1

1,526,131

INVENTOR.
H. D. Gilbert,
BY Geo. P. Kimmel.
ATTORNEY.

Feb. 10, 1925.            H. D. GILBERT            1,526,131
              MILK BOTTLE HOLDER
         Filed June 29, 1923        2 Sheets-Sheet 2
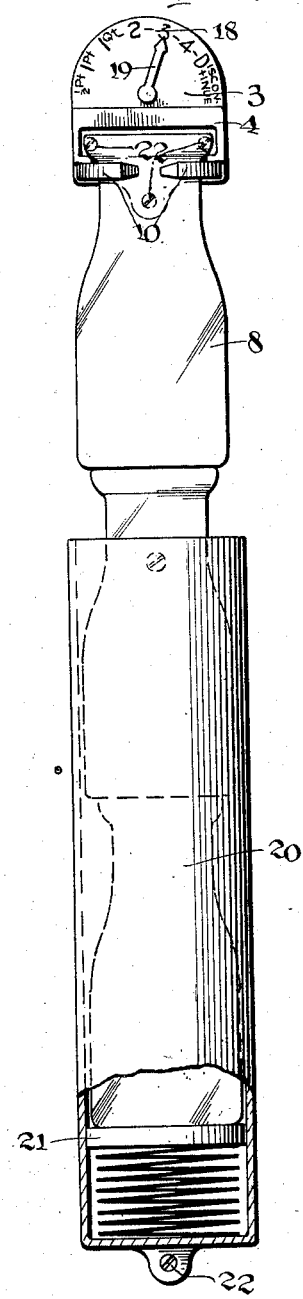
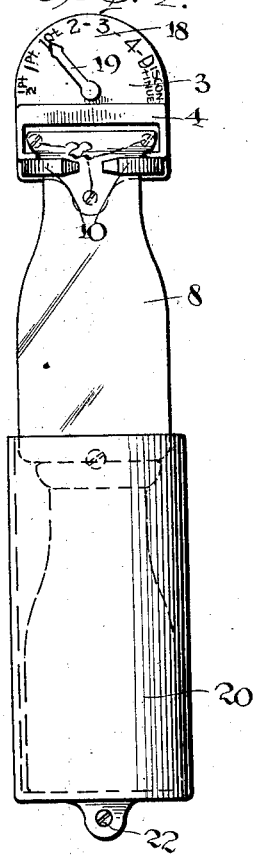
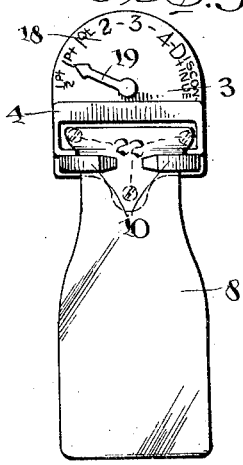
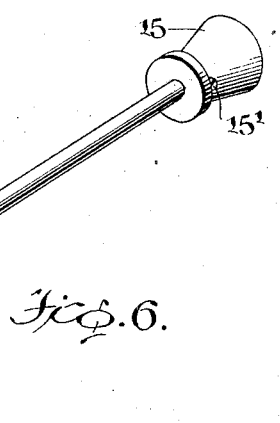
INVENTOR.
H. D. Gilbert,
BY
Geo. P. Kimmel
ATTORNEY.

Patented Feb. 10, 1925.

1,526,131

UNITED STATES PATENT OFFICE.

HIRAM D. GILBERT, OF ABILENE, TEXAS, ASSIGNOR OF ONE-HALF TO R. W. HAYNIE, OF ABILENE, TEXAS.

MILK-BOTTLE HOLDER.

Application filed June 29, 1923. Serial No. 648,541.

*To all whom it may concern:*

Be it known that I, HIRAM D. GILBERT, a citizen of the United States, residing at Abilene, in the county of Taylor and State of Texas, have invented certain new and useful Improvements in Milk-Bottle Holders, of which the following is a specification.

This invention relates to bottle holding and locking devices and has for its main object the provision of a device in which bottled goods may be placed, upon delivery, and securely held against unauthorized removal.

A further object is the provision of a device which will lock the bottle in position and which will allow the bottle to be released only from the interior of the building to which it is attached, without the use of keys or the manipulation of a combination lock.

A further object is the provision of a bottle holder which will protect the mouth of the bottle, thus preventing the stopper from being taken out for the removal of the contents.

A still further object of the invention is the provision, with a bottle holder and lock, of a dial and indicator denoting the quantity, if any, of milk desired.

A final object is the provision of a milk bottle holding device which will be neat in appearance, strong, durable and inexpensive to manufacture.

A clearer and better understanding of the device may be had upon reference to the accompanying drawing, in which:—

Fig. 3 is a front elevation of the device, provided with a receptacle for the reception of two or more bottles, in addition to that held by the device.

Fig. 4 is a front elevation of the device provided with a receptacle for the reception of one bottle, in addition to that held by the device.

Fig. 5 is a front elevation of the device carrying a single bottle, and

Fig. 6 is a detail perspective of the acuating rod and locking head.

Figure 1:
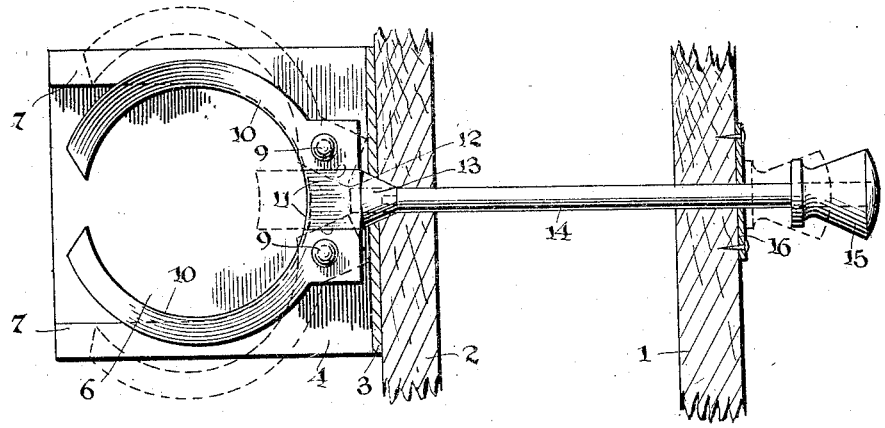
Figure 1 shows a bottom plan view of the device, as applied to a building wall, parts being in section.

Referring now to the drawing in detail, numerals 1 and 2 indicate the inner and outer walls of a building to which is attached by suitable means, the plate 3, having formed integral therewith a housing 4. The housing 4 is open across the lower part of its front side as at 5 and has its bottom side provided with a recessed portion as shown at 6. This cut in portion is of less width and depth than the housing, thus providing ledges 7 along either of its sides. These ledges serve to support the milk bottle 8, taking the weight off of the locking element, which element is described further on, and preventing the bottle from dropping when the locking element is released.

Attached to the under surface of the housing 4, at its rear, by means of bolts 9, is a pair of opposed inwardly curved arms 10, adapted to be swung upon their attaching bolts. These arms 10, are spaced apart at their pivoted ends as shown, the opposed edges 11, of these ends being parallel when the arms are in the closed position, for the purpose to be hereinafter set forth.

Positioned between the edges 11 of the ends of the arms 10, is a shiftable cubical locking head 12, which prevents the arms from swinging outwardly when the head is in retracted position, as shown in Figure 1. The inner side of the head has a conoidal-shaped portion formed thereon, as shown at 13, which portion when the head is moved forward to occupy the position shown in dotted lines in Figure 1, allows the edges 11 of the arms 10, to swing to an outwardly diverging position with the arms, as shown. This portion 13 passes through an aperture 13ª in the plate 3, which aperture as shown is tapered so that the portion 13 can only be drawn back a limited distance. The apex of the portion 13 has threaded bore therein to receive the threaded reduced end 14ª of an actuating rod 14, which rod passes through the walls of the building and terminates therein. A knob 15 is carried upon the inner terminal portion of the rod 14, and this knob is slidably secured to the rod by means of the screw 15'. This screw 15' holds the knob in any desired adjusted position, according to the thickness of the wall through which the rod 14 passes, and the manner in which the other end of the rod is connected to the conoidal-shaped portion 13 allows the disconnection from the head for the dismantling of the device. This allows the knob to be adjusted to allow for varying thicknesses. A plate 16, is provided upon the inner side of the wall 1, against which the knob 15, abuts when the device is in unlocked position.

Figure 2:
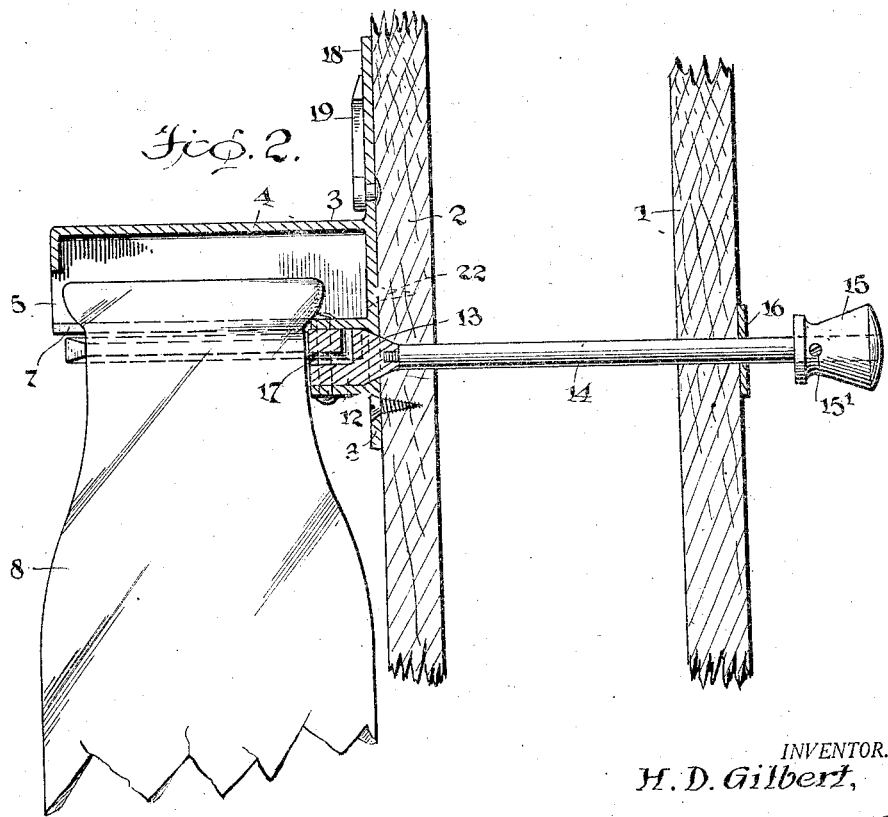
Fig. 2 is a vertical sectional view of the device as applied to a wall, and supporting a milk bottle.

Extending from the face of the plate 3, is a guide or supporting plate 12a, which serves to support the head 12 as shown in Figure 2, and also protects the head from being surreptitiously moved to release the arm from about the neck of the bottle held thereby.

An aperture 17, is provided in the head 12, which extends into the body thereof from the front and then extends upward to the top surface as shown. By means of this aperture the head may be drawn out, when the device is empty, by a person on the outside of the building, should the same become locked.

The upper part of the plate 3, is arc-shaped to provide a dial 18, suitably marked upon its face, and is provided with a pointer 19, adapted to be swung across the face thereof to indicate the quantity of milk desired.

Positioned below the housing and locking arms is a container 20, which may be of varying length to accommodate one, two, three or more bottles of milk. When a long container is used as shown in Fig. 3, where it is desired to receive more than two bottles of milk, a spring supported platform 21, is provided so that the lowest bottle will be raised to the top of the container and removed without difficulty.

Tabs 21a are provided at the lower ends of the containers for attaching the same to the wall by means of screws 22, the upper end having a screw passed through the wall of the receptacle and into the building wall. This method of attaching the receptacle prevents the removal of the screws while there are bottles in the receptacle. The same protection is accorded in placing the screws 22a, within the housing as shown.

In depositing a bottle in the holder, should the arms be closed and locked, the nail of the index finger is engaged in the notch 17, and the member 12, drawn forward, thus bringing the bevelled surface 13, in position between the edges 11 of the pivoted ends of the arms 10, which may then be pressed outward, as indicated in the dotted position shown in Fig. 1.

The lip of the milk bottle is then placed in the opening 5, above the ledges 7, and pressed backward pressing against the outer end of the member 12, pushing that back and forcing apart the edges 11 at their rear ends thus drawing in the arms 10 about the neck of the bottle. It can be seen that with the member 12, positioned between the edges 11, and the bottle in position in front of the same, that the member 12, cannot be moved forward again, to release the bottle except by pressing the knob 15, which is located within the house.

Having thus described this device in accordance with the showing of the drawings, it is to be understood that various changes and modifications may be made in the same without departing from the spirit of the invention, as embodied in the claims.

What I claim is:—

1. In a bottle holder of the character set forth, a vertical supporting plate, a housing projecting from the face of said plate and opened along its lower front portion and having its bottom formed with a recess of less width and depth than the housing thereby providing a ledge surrounding said recess for receiving the lip of and suspendingly supporting a milk bottle, said plate having a tapered aperture therethrough beneath the longitudinal center of the housing, a horizontal supporting plate extending from the face of said vertical supporting plate beneath said aperture, a pair of opposed laterally swinging arms pivotally supported in spaced relation at their rear ends to the under side of said housing, a locking element for said arms comprising, a cubical head shiftably positioned between the housing and said plate and further adapted to be positioned between said spaced arm ends to lock the same in closed position, said head having upon its rear side a conoidal-shaped portion adapted to partially extend through said aperture, and an actuating rod connected to said conoidal-shaped portion for shifting said element.

2. In a bottle holder of the character set forth, a vertical supporting plate, a housing projecting from the face of said plate and opened along its lower front portion and having its bottom formed with a recess of less width and depth than the housing thereby providing a ledge surrounding said recess for receiving the lip of and suspendingly supporting a milk bottle, said plate having a tapering aperture therethrough beneath the longitudinal center of the housing, a horizontal supporting plate extending from the face of said vertical supporting plate beneath said aperture, a pair of opposed laterally swinging arms pivotally supported in spaced relation at their rear ends to the under side of said housing, a locking element for said arms comprising, a cubical head shiftably positioned between the housing and said plate and further adapted to be positioned between said spaced arm ends to lock the same in closed position, said head having upon its rear side a conoidal-shaped portion having a threaded bore in the apex thereof, said portion being adapted to partially extend through said aperture, and an actuating rod for said means, having a reduced threaded end removably engaged in said bore.

In testimony whereof, I affix my signature hereto.

HIRAM D. GILBERT.